United States Patent [19]

Fukunaga et al.

[11] Patent Number: 4,691,870

[45] Date of Patent: Sep. 8, 1987

[54] ELECTRIC FOOD PROCESSOR

[75] Inventors: Masao Fukunaga, Yokaichi; Hiroshi Nonoguchi, Yao, both of Japan

[73] Assignee: Matsushita Electric Industrial Co., Osaka, Japan

[21] Appl. No.: 783,919

[22] Filed: Oct. 3, 1985

[30] Foreign Application Priority Data

Oct. 9, 1984 [JP] Japan ................................ 59-212029
Oct. 9, 1984 [JP] Japan ................................ 59-212025

[51] Int. Cl.$^4$ ............................................. B02C 18/12
[52] U.S. Cl. .................................... 241/36; 241/37.5; 241/92; 241/282.2
[58] Field of Search ..................... 241/36, 37.5, 282.1, 241/92, 282.2, 57

[56] References Cited

U.S. PATENT DOCUMENTS

| | | | |
|---|---|---|---|
| 4,111,372 | 9/1978 | Hicks et al. | 241/282.1 X |
| 4,127,342 | 11/1978 | Coggiola | 241/282.1 X |
| 4,448,100 | 5/1984 | Breeden | 241/92 X |
| 4,516,733 | 5/1985 | Funagura et al. | 241/92 X |
| 4,523,720 | 6/1985 | Behringer et al. | 241/92 X |
| 4,602,543 | 7/1986 | Homma | 241/92 X |

Primary Examiner—Mark Rosenbaum
Attorney, Agent, or Firm—Wenderoth, Lind & Ponack

[57] ABSTRACT

An improved electric food processor which may be mainly used at home in general for slicing, cutting into small pieces or shredding vegetables and the like. The food processor is arranged to be capable of charging and cutting materials of a size up to a diameter of its container having a discharge passage of cut pieces for efficient processing.

9 Claims, 16 Drawing Figures

ELECTRIC FOOD PROCESSOR

BACKGROUND OF THE INVENTION

1. Field of the Invention:

The present invention generally relates to a food cutting apparatus or a so-called food processor which may be mainly used at home in general for slicing or shredding vegetables or the like into short and small pieces, fine chips, etc.

2. Description of the Prior Art:

Generally, electric food processors of the above described type have been broadly classified into two kinds based on movement of the cut pieces subjected to cutting by a disc-shaped cutter driven for rotation by a motor within a container, one kind of which is referred to as a cut piece storage type which accommodates the cut pieces within the container, while the other kind is called a cut piece discharge type which is arranged to discharge the cut pieces out of the container.

In the known electric food processors of the above described type, the food processor of the cut piece discharge type adapted to discharge the cut pieces out of the container has been generally constituted by a main body in which an electric motor is incorporated, a container placed on the main body, a disc-shaped cutter driven by the electric motor for rotation within the container, a disc member positioned below the cutter for rotation in the same direction as that of the cutter so as to discharge the cut pieces processed by the cutter out of the container, a container lid for covering an opening of the container, and a push rod for depressing material to be cut towards the cutter through a cylindrical feed tube or charge port provided in part of said container lid, etc. Moreover, the disc-shaped cutter and the disc member for discharging the cut pieces may be adapted to be replaced by an S-shaped cutter so as to enable cutting or shredding within the container.

The conventional electric food processor of the cut piece discharge type constructed in the above described manner is capable of continuously effecting a large amount of cutting without being limited by the size of the container, but there has been such an inconvenience that the material to be processed must be preliminarily cut into small pieces for charging through the cylindrical charge port of the food processor. Another disadvantage in the known food processor as described above is such that, although it is preferable to rotate the disc-like cutter at low speed to prevent the cut pieces from losing shape, performance of the food processor is undesirably lowered particularly during use of the S-shaped cutter as referred to above.

SUMMARY OF THE INVENTION

Accordingly, an essential object of the present invention is to provide an electric food processor which is arranged so that an entire opening at the upper portion of a container serves as a charge port for materials to be cut, while necessity for preliminarily cutting the material into small pieces has been eliminated by effecting rotational control of a driving motor for obtaining revolutions corresponding to characteristics of respective cutters, thereby substantially eliminating disadvantages inherent in the conventional food processors of this kind.

Another important object of the present invention is to provide an electric food processor of the above described type which is simple in construction and which functions accurately, and which can be readily manufactured at a low cost.

In accomplishing these and other objects, according to one preferred embodiment of the present invention, there is provided an electric food processor which includes a main body, an electric motor incorporated in said main body, a discharge container having a generally cylindrical configuration placed on said main body, a container lid for covering an upper opening of said discharge container, a vertically movable depressing disc provided on said container lid, a disc-shaped rotary base rotatably provided within said discharge container so as to be driven by said electric motor, a cutting blade mounted on said rotary base for cutting material into pieces, a rotary disc for centrifugal discharge of the cut pieces provided below said rotary base for simultaneous rotation therewith, and a discharge port provided in a side wall of said discharge container beside said rotary disc, with a cut material accommodating portion being defined between said container lid and said rotary base.

By the arrangement according to the present invention as described above, an improved electric food processor has been advantageously presented having a simple construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1A:
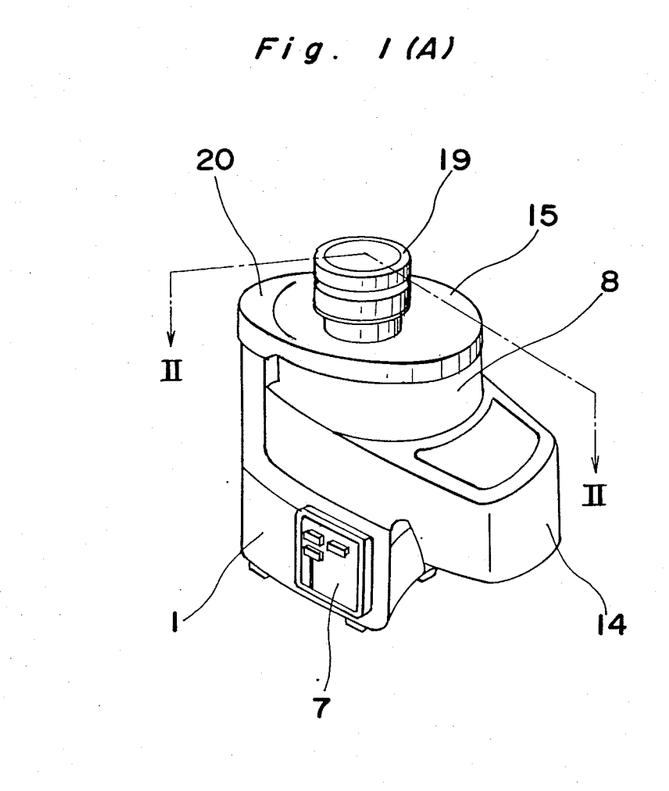
FIG. 1(A) is a perspective view of an electric food processor according to one preferred embodiment of the present invention, showing a state where a discharge container is set on its main body.
Figure 2:
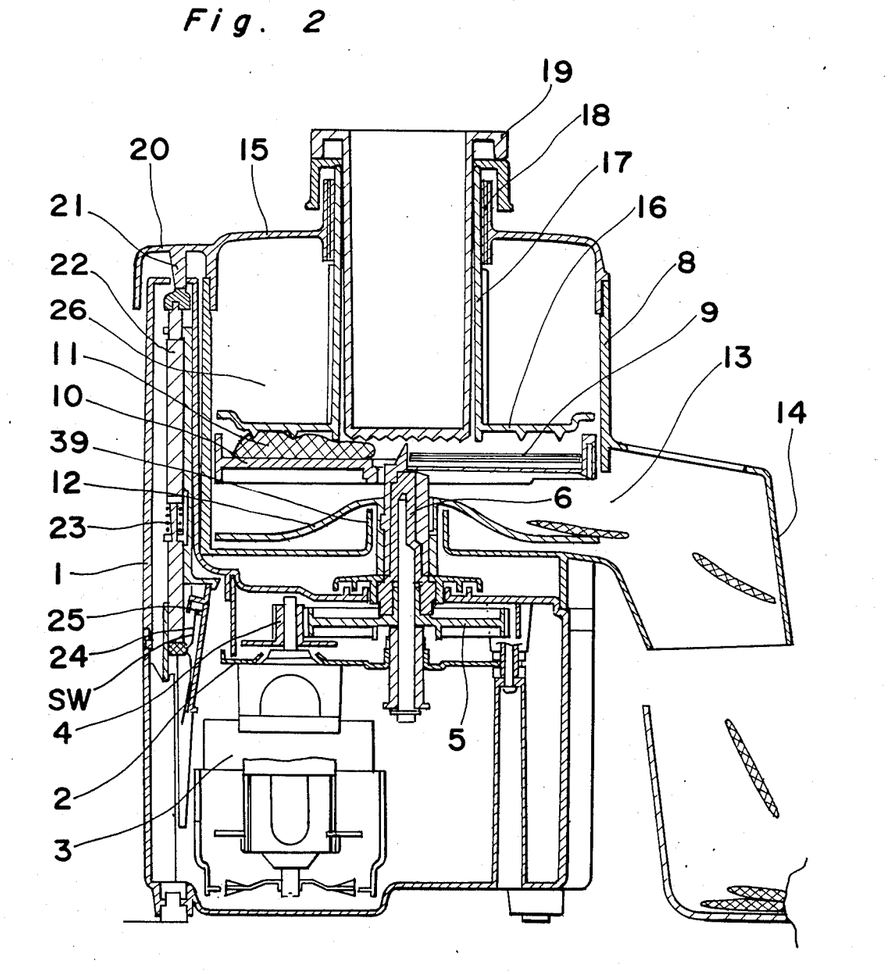
FIG. 2 is a side sectional view, on an enlarged scale, taken along the line II—II in FIG. 1(A)

Referring now to the drawings, there is shown in FIGS. 1(A) and 2, an electric food processor according to one preferred embodiment of the present invention. The food processor of the present invention includes a main body casing 1 in which there are incorporated an electric motor 3 mounted on a chassis 2, a gear 4 fixed to an output shaft of said motor 3, another gear 5 engaged with the gear 4 and fixed on a main spindle 6, and rotation control members 7 for the main spindle 6 and the motor 3, with the upper end of the main spindle 6 projecting towards the upper portion of the main body casing 1. On the main body casing 1 as described above, there is a discharge container 8, and the upper end of the main spindle 6 extends into the discharge container 8 through an opening formed in the bottom of said container 8. Mounted on the main spindle 6 are a rotary base 10 on which a cutter blade 9 is attached and a rotary disc 12 adapted to rotate simultaneously with said rotary base 10 for discharging cut pieces 11 of the material through centrifugal force. The discharge container 8 is provided, at its portion in the vicinity of the bottom portion thereof, with an opening 13 and a discharge passage 14 for discharging the cut pieces 11 therethrough. Meanwhile, a container lid 15 is arranged to be merely placed on the discharge container 8, without being locked thereto, and is provided with a cylindrical bearing portion 18 in which a hollow shaft portion 17 of a depressing disc 16 for depressing the cut pieces 11 downwardly is slidably received for vertically sliding therein. Moreover, in order to prevent the material from falling down in the case where a thin and long material, such as a cucumber, is to be cut, such a material may be charged into the container 8 through the hollow interior of the shaft portion 17 for the depressing disc 16, and in this case, a push rod 19 which can be inserted into the shaft portion 17 is provided for depressing the material downwardly. The container lid 15 set on the discharge container 8 is provided, at its upper portion, with a switch depressing portion 20 having a depressing rib 21 which is arranged to correspond in position to a switch button 22 provided on the main body casing 1. The switch button 22 normally urged upwardly by a spring 23 provided at its lower end includes a switch SW having a movable contact 24 and a stationary contact 25, and when the switch button 22 is depressed downwardly by the rib 21 against the spring 23, the movable contact 24 is brought into contact with the stationary contact 25, whereby the switch SW is closed to energize the motor 3 for starting operation of the food processor.

By the above construction, material to be cut having a size close to an area or a diameter of the opening of the discharge container 8, and up to a volume defined between the container lid 15 and the rotary base 10 within the discharge container 8, may be charged into said container 8 by just removing the container lid 15 upwardly, and during operation, the material may be cut by applying the container lid 15 onto the container 8, and depressing the shaft portion 17 of the depressing disc 16 downwardly by one hand, while pressing the switch depressing portion 20 of the lid 15 with the other hand. In the food processor of the above described type, since the operation is effected by depressing the container lid 15, there is no possibility that an operator's hand may undesirably enter the discharge container 8 during operation to touch the cutting blade 9, and therefore, it is not necessary to lock the container lid 15, thus making it easy to charge the material to be cut, and also, to open or close the container lid 15.

Subsequently, referring particularly to FIG. 1(B) and FIG. 3, description will be made with reference to the case where the material is to be cut through employment of a retaining container 27 and an S-shaped cutter 28 for preparing shredded chips of vegetables, minced meats, etc.

Figure 1B:
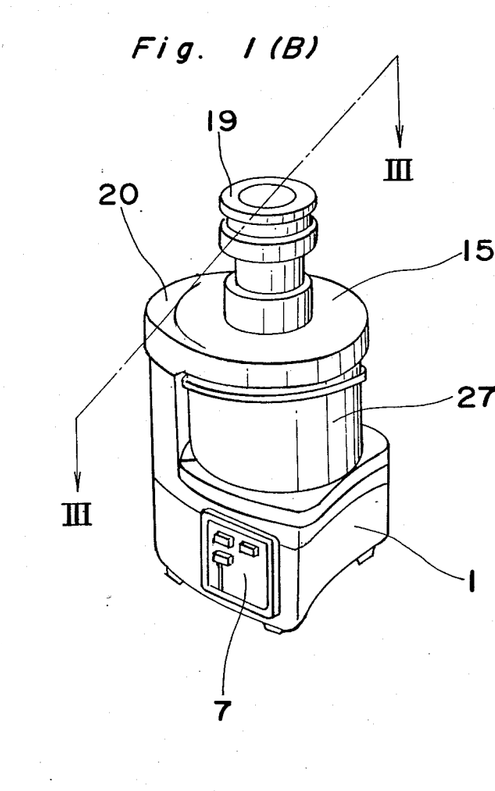
FIG. 1(B) is a perspective view similar to FIG. 1(A), in which the discharge container is replaced by a retaining container.
Figure 3:
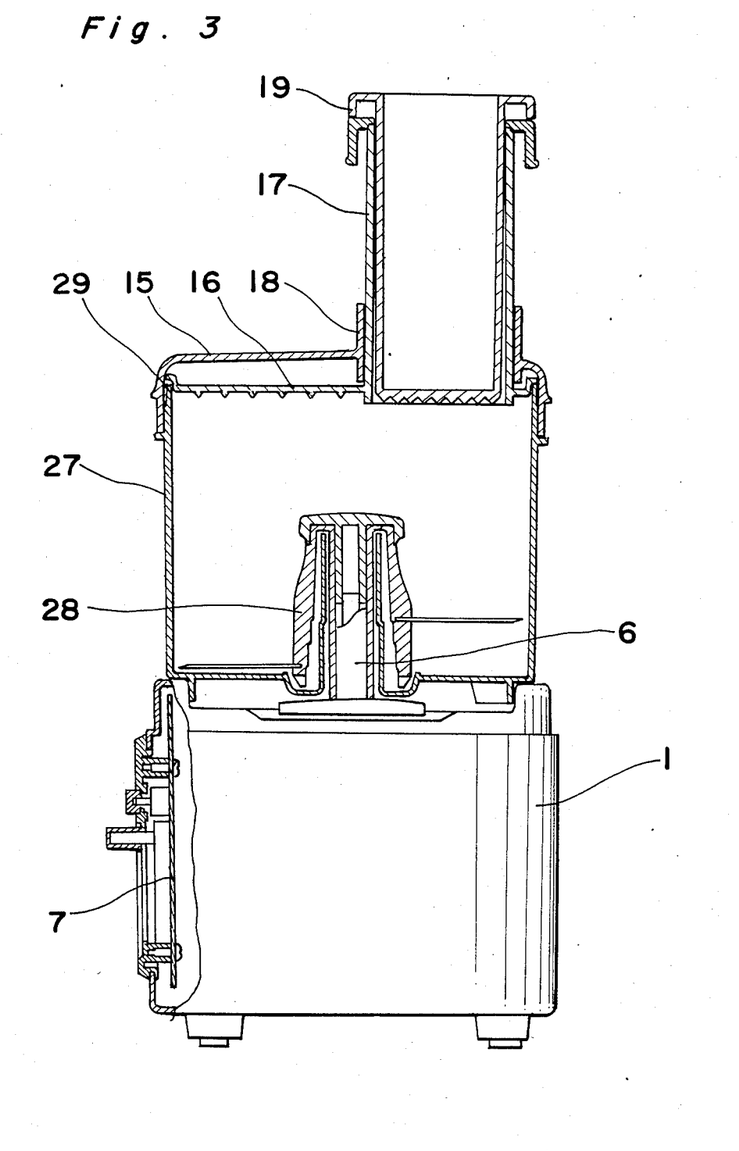
FIG. 3 is also a side sectional view, on an enlarged scale, taken along the line III—III in FIG. 1(B)

More specifically, in FIGS. 1(B) and 3, the discharge container 8 has been replaced by the retaining container 27 having an opening at its bottom portion for permitting entry of the main spindle 6 and retaining container 27 and set on the main body casing 1, with the S-shaped cutter 28 being mounted on the main spindle 6. The retaining container 27 is provided with a depressing disc receiving portion 29 around the edge of its upper opening so as to raise said disc 16 upwardly for preventing said depressing disc 16 from contacting the S-shaped cutter 28, and for providing a sufficient space for accommodating cut pieces, and also for serving as a cover for the container 27.

The setting of the food processor as described earlier with reference to FIGS. 1(A) and 2 is in the state for cutting vegetables and the like for continuous discharge, and the switch SW is closed by depressing the switch depressing portion 20 of the container lid 15 downwardly to start the motor 3 for effecting the cutting by the cutting blade 9, with the cut pieces 11 being continuously discharged through the discharge passage 14, while in the setting of FIGS. 1(B) and 3, by the employment of the retaining container 27, cutting may be readily effected in the state where the cut pieces 11 are retained in the container 27, with the container lid 15 commonly used for both states.

Figure 4:
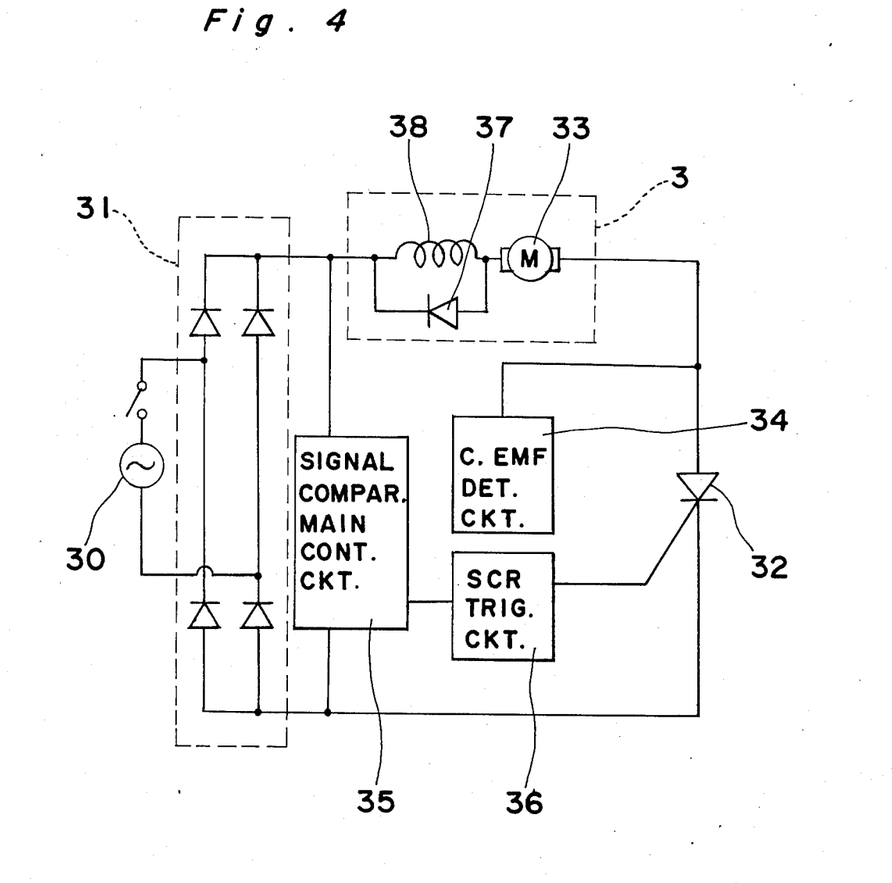
FIG. 4 is an electrical block diagram of a speed control circuit incorporated in the electric food processor of FIG. 1.

Referring also to FIG. 4, there is shown a speed control circuit for controlling rotation of the motor 3. The control circuit in FIG. 4 includes a diode bridge 31 (surrounded by dotted lines) connected to a commercial power source 30, the motor 3 having an armature 33 and a field winding 38, with a diode 37 connected across the field winding 38 to reduce attenuation of the counter electro-motive force at the winding 38 for assisting in the detection, an SCR (silicon controlled rectifier) 32 connected in series with the motor 3, a signal comparison main control circuit 35 connected in parallel with the diode bridge 31, a counter electro-motive force detecting circuit 34 connected between the control circuit 35 and the anode side of the SCR 32, and an SCR trigger circuit 36 connected between the control circuit 35 and the gate of said SCR 32.

By the above circuit construction, the power from the commercial power source 30 is subjected to full-wave rectification by the diode bridge 31, and voltage turned on or off by the SCR 32 for phase control is applied to the motor 3. The control is effected by triggering the gate of the SCR 32 through the SCR triggering circuit 36 via the counter electro-motive force detecting circuit 34 which detects the counter electromotive force proportional to the rotational speed of the armature 33 of the motor 3 during the off period of the SCR 32, and the signal comparison main control circuit 35 which effects comparison with a predetermined rotational speed according to the signal of the detecting circuit 34 to produce a signal for turning on or off the SCR 32. Since the counter electro-motive force produced by the armature 33 is proportional to the rotational speed thereof, it becomes possible to subject the rotational speed to the feed-back control through utilization of its counter electro-motive force.

Figure 5:
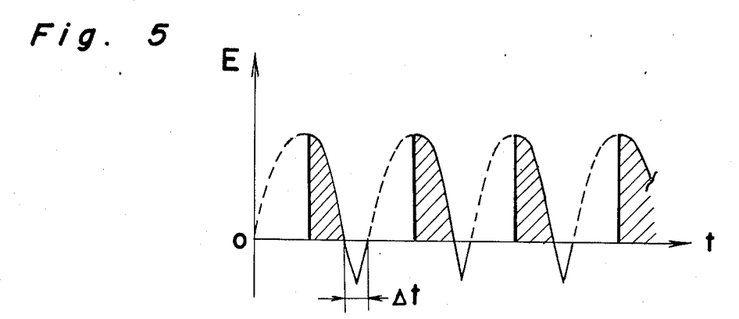
FIG. 5 is a diagram showing a voltage waveform to be applied to an electric motor employed in the food processor of FIG. 1 under a non-load state controlled for speed.
Figure 6:
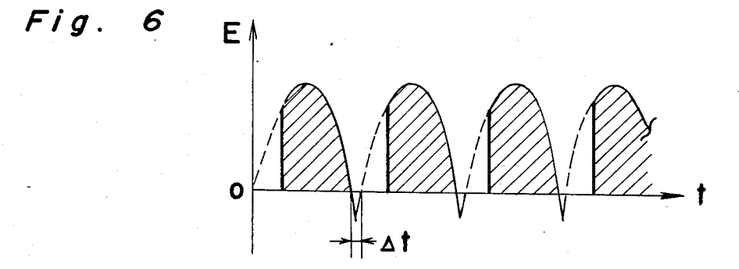
FIG. 6 is a diagram showing a voltage waveform in the case of a light load.

Now, it is assumed that, during non-load period, a voltage having a waveform as shown in FIG. 5 is applied to the motor 3 by the speed control circuit of FIG. 4. In this case, the SCR 32 is provided with a time period for a voltage lower than 0 V by a minus voltage due to the counter electro-motive force represented by $\Delta t$ in the drawing and can be turned off. Subsequently, when a load is started to be applied, the rotational speed of the armature 33 is lowered, with a reduction in the generation of the counter electromotive force, and thus, this is detected to increase the voltage to be applied as shown in FIG. 6. In this case also, the time period for the voltage lower than 0 V in $\Delta t$ second to turn off the SCR 32 is maintained, and the SCR 32 is effecting the on/off function per each wave. However, when the load becomes large, with the rotational speed of the armature 33 started to be lowered to a large extent, sufficient rotational speed can not be achieved even when the impressed voltage is increased, with the generation of the counter electro-motive force being small, and thus, the SCR 32 can not be turned off in the timer period shown by $\Delta t$ in the drawing so as to be held in the "on" state during the subsequent whole waveform. Due to the increase in the rotational speed at this time, the time period becomes $\Delta t2$ in the next waveform, with the SCR 32 turned off. With such a state being repeated, when the load is further increased, the time period $\Delta t2$ is not sufficient as the time period for turning off the SCR 32, and thus, the SCR 32 is continuously held in the "on" state. Accordingly, time periods for voltage lower than 0 V in the range of several microseconds to milliseconds have been normally required for turning off the SCR 32.

Figure 7:
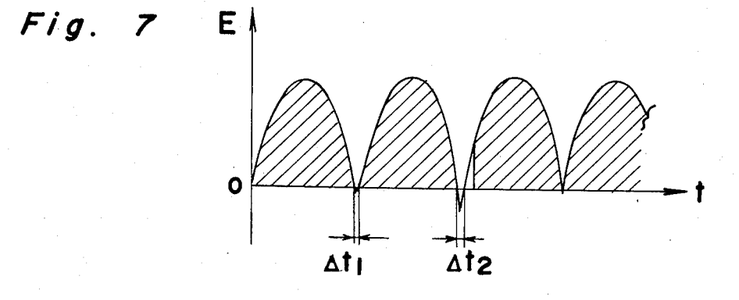
FIG. 7 is a diagram showing a voltage waveform in the case of a heavy load.
Figure 8:
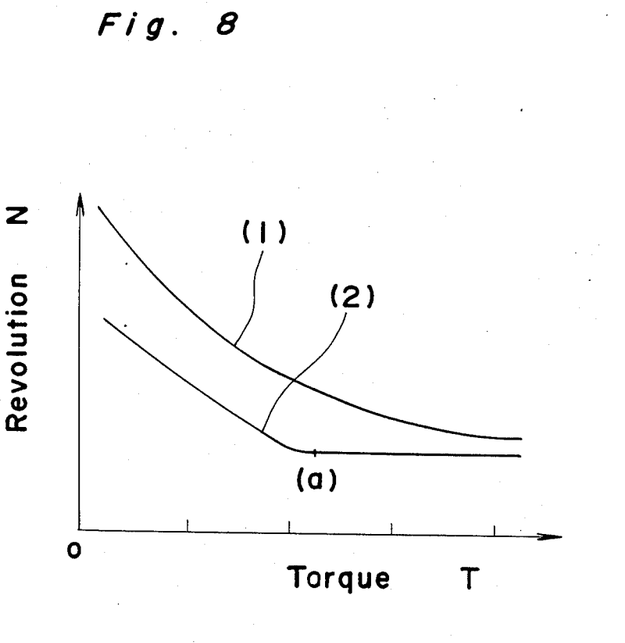
FIG. 8 is a graph showing revolution (N)-torque (T) curves for the electric motor employed in the food processor of FIG. 1.

In the graph of FIG. 8, the relation between the load torque and revolutions of the motor 3 is shown in a curve (2). It is seen from the graph of FIG. 8 that the state as shown in FIG. 7 is entered at a point (a). Meanwhile, a curve (1) in FIG. 8 represents the state when a full-wave is applied.

As is seen from FIG. 8, the number of revolutions of the motor 3 during a non-load period or a low load period may be held small by the control circuit of FIG. 4, and therefore, there may be eliminated such an inconvenience that, during a comparatively low load period as in the case where the material is cut while cut pieces are being discharged, the cut pieces are undesirably damaged during discharge of such cut pieces due to excessively high rotational speeds. Thus, vibrations during cutting of the material are reduced for neat cutting. Moreover, in the case where the cutting is effected by the S-shaped cutter 28, through employment of the retaining container 27, rotational speeds necessary for the cutting may be maintained even during high load periods.

Figure 9:
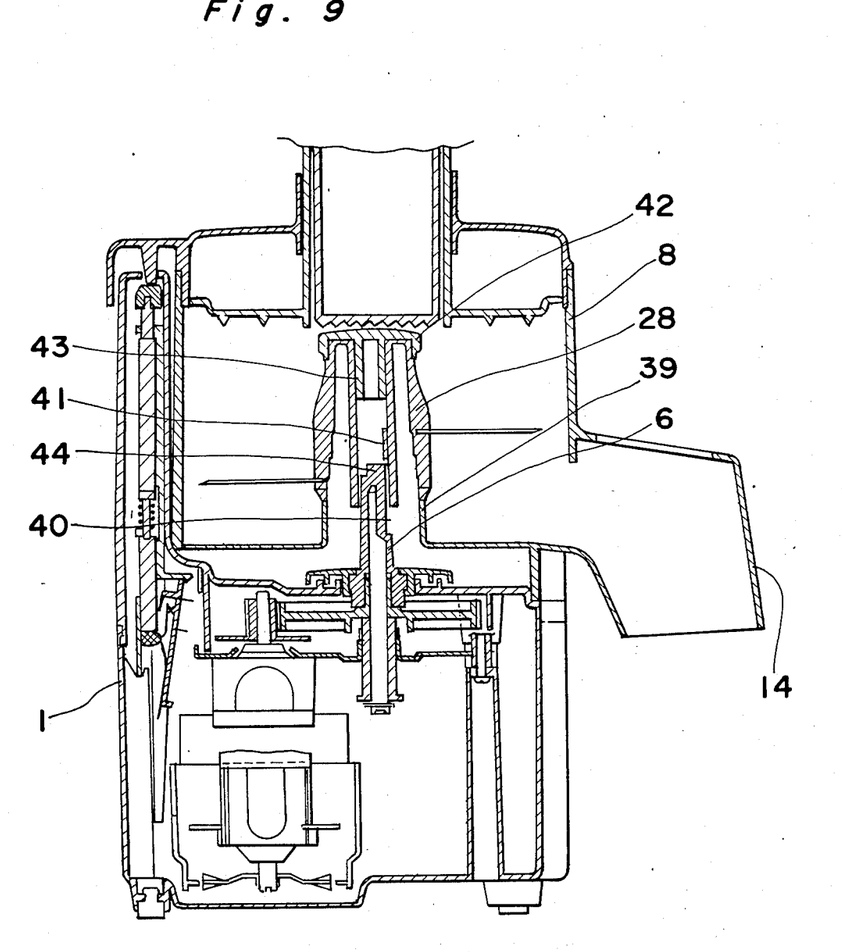
FIG. 9 is a side sectional view similar to FIG. 2, in which the cutter blade is replaced by an S-shaped cutter.
Figure 10:
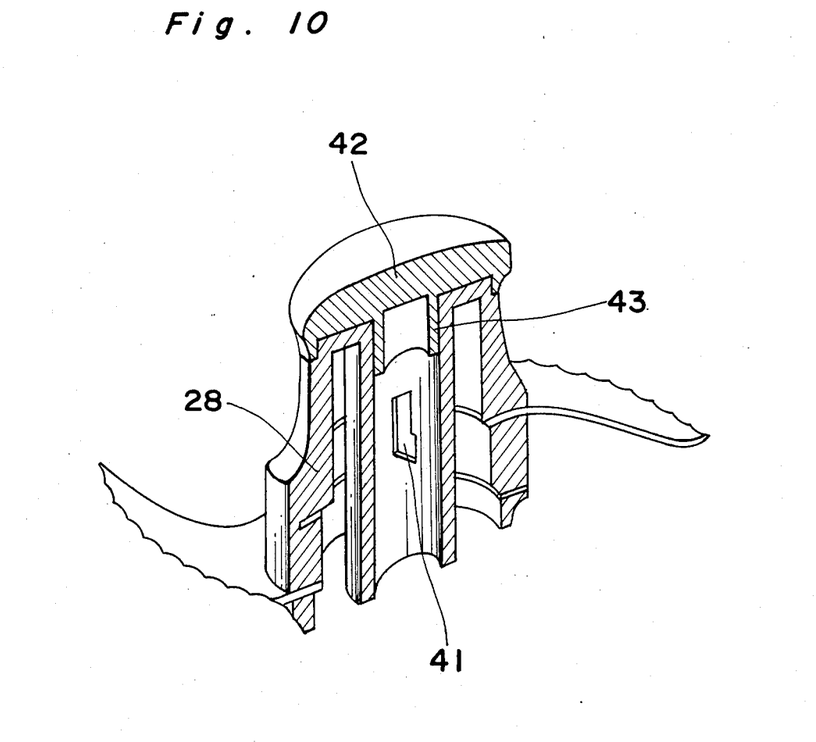
FIG. 10 is a sectional perspective view showing on an enlarged scale, the S-shaped cutter of FIG. 9.
Figure 11:
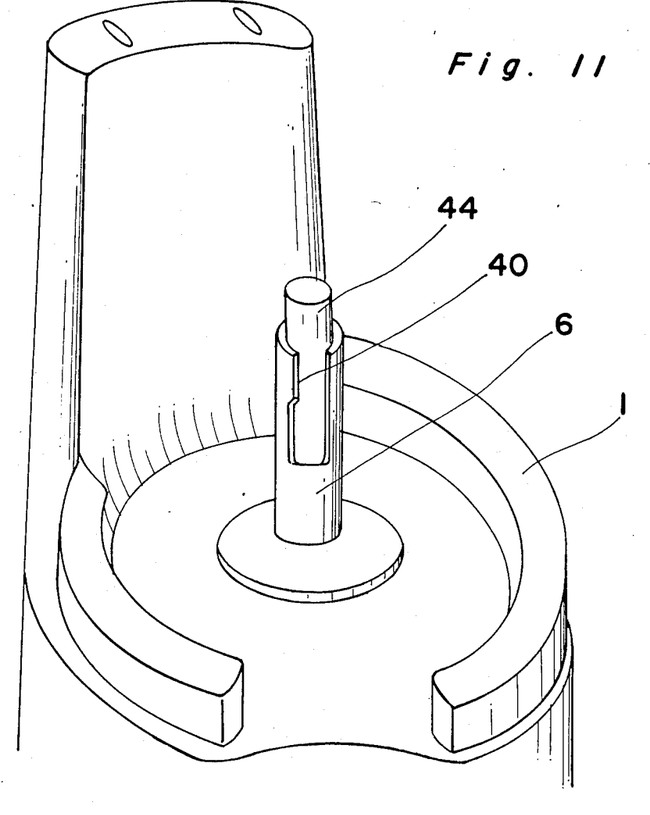
FIG. 11 is a perspective view at the upper portion of the main body for the food processor of FIG. 1.

Subsequently, as shown in FIG. 9, when the S-shaped cutter 28 fitted on the main spindle 6 is intended to be rotated in the state where the discharge container 8 is set on the main body casing 1, it is very dangerous if fingers should be inserted through the discharge passage 14 so that finger tips may reach the edge portion of the S-shaped cutter 28. Therefore, according to the present embodiment of FIG. 9, a cylindrical rib 39 is provided at the central portion in the bottom of the discharge container 8 on top of which the S-shaped cutter 28 must be disposed. By the above cylindrical rib 39, the S-shaped cutter 28 is pushed up to such a position that a retaining projection 41 formed in a shaft portion of the S-shaped cutter 28 as illustrated in FIG. 10 is out of engagement with a recess or retaining portion 40 formed on the main spindle 6 as shown in FIG. 11, and thus, the S-shaped cutter 28 becomes incapable of rotating in this case for safety purposes. As is seen from FIG. 10, a cap 42 applied onto the shaft portion of the S-shaped cutter 28 is provided at its central portion, with a cylindrical wall 43 depending downwardly therefrom so as to be fitted onto the corresponding upper end 44 of the main spindle 6 when the cutting by the S-shaped cutter 28 is effected through employment of the retaining container 27, thereby to prevent the S-shaped cutter 28 from being vibrated during rotation.

Figure 12:
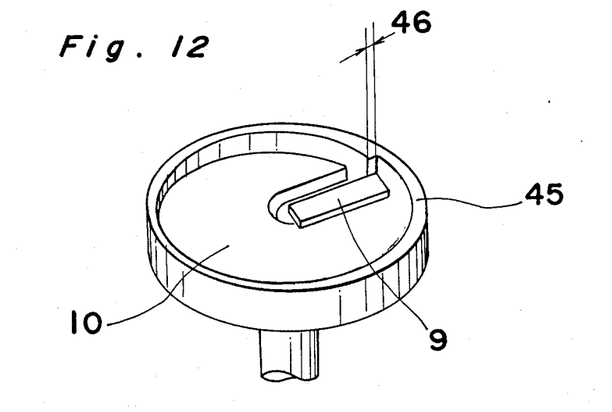
FIG. 12 is a perspective view of a rotary base employed in the food processor of FIG. 1.

As shown in FIG. 12, the rotary base 10 is provided with an annular outer wall 45 extending upwardly from its outer peripheral edge, and at a position immediately before the cutter blade 9 with respect to the rotational direction of the rotary base 10, the outer wall 45 is formed with an overlapped portion 46 at which the inner wall portion of the outer wall 45 is located at an inner side with respect to the outer side of the cutter blade 9, with the configuration of said inner wall portion being varied in a smooth curve so that cut pieces 11 may not be caught thereby. By providing the overlapped portion 46 between the outer wall 45 and the cutter blade 9, the material to be cut is guided inwardly so as to be positively cut at the inner blade edge portion spaced from the outer edge of the cutter blade 9, without entering between the outer wall 45 and the cutter blade 9, and thus, smooth cutting may be effected.

Figure 13:
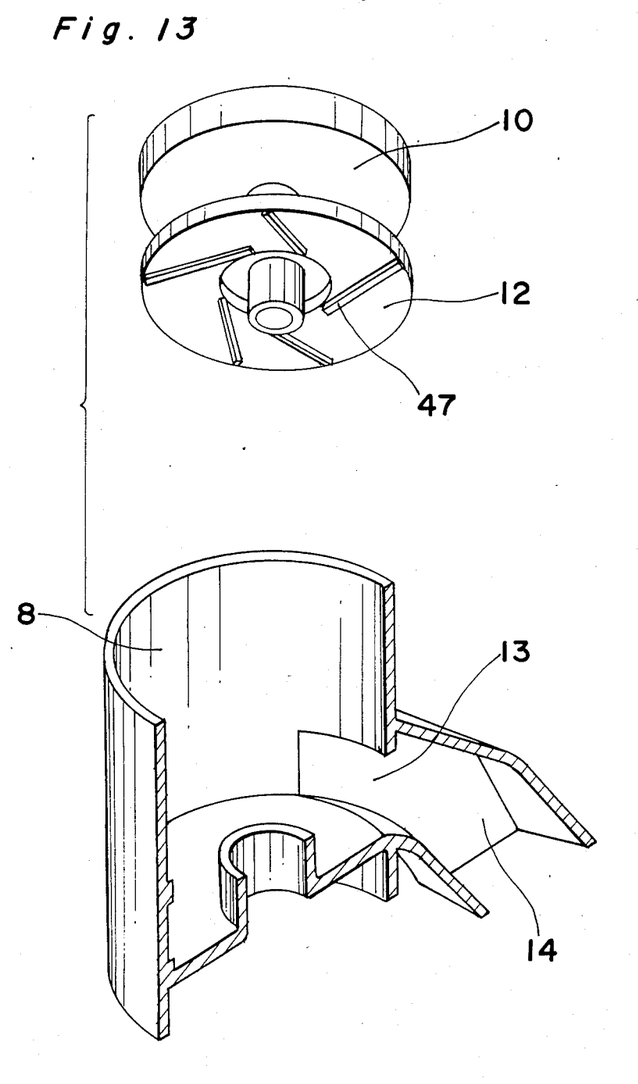
FIG. 13 is an exploded perspective view partly in section, of the rotary base and rotary disc together with the discharge container employed in the food processor of FIG. 1.

Moreover, as shown in FIG. 13, a plurality of discharge ribs 47 are provided, at an angle, on the reverse surface of the rotary disc 12 so that the outer peripheral ends of said ribs 47 may delay in the movement with respect to the rotational direction of the rotary disc 12. By the provision of the above discharge ribs 47, the cut pieces 11 entering the gap between the discharge container 8 and the rotary disc 12, and directed towards the reverse side of the rotary disc 12 are pushed towards the outer peripheral portion so as to be discharged outside through the discharge passage 14, without being held between the rotary disc 12 and the bottom of the discharge container 8, thus making it possible to effect the cutting in an efficient manner.

Figure 14:
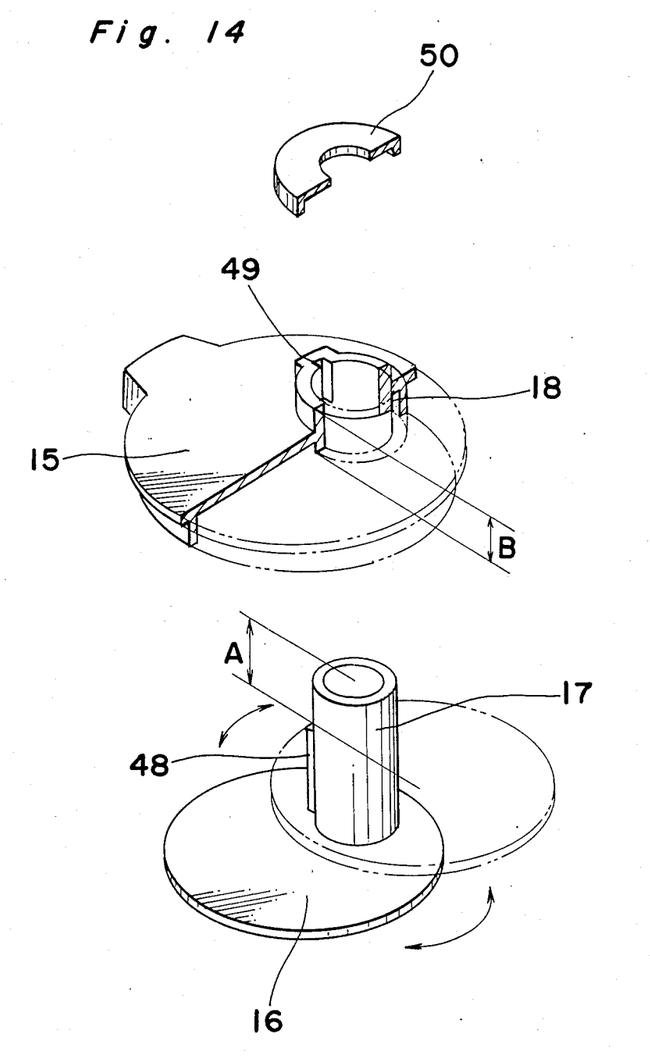
FIG. 14 is an exploded perspective view of a container lid and a depressing disc employed in the food processor of FIG. 1.

Additionally, as shown in FIG. 14, on the outer wall of the shaft portion 17 for the depressing disc 16, a projecting rib 48 is provided so as to extend from a position lower than a length slightly larger than a height of the bearing portion 18 for the container lid 15 in relation to the upper end of the shaft portion 17, and extending to the surface of the depressing disc 16. The length A of the shaft portion 17 for the depressing disc 16 without the projecting rib 48 and the length B, the height of the bearing portion 18 for the container lid 15, are adapted to be of a relation in which $A > B$. Meanwhile, acting as a groove engageable with said projecting rib 48, there is a recess 49 at the inner side of the hollow bearing portion 18 of the container lid 15 which serves as a guide when the depressing disc 16 is slid vertically, and which also serves as a stopper in a rotating direction for restricting the disc 16 from rotating. However, due to the relation A>B as described above, the engagement between the projecting rib 48 and the recess 49 is released upon depression of the disc 16 downwardly, and thus, the depressing disc 16 is released from the restriction in the rotating direction, and may be cleaned while being rotated. In order to prevent the depressing disc 16 from falling off, a cap 50 for the disc 16 is welded onto the upper end of the shaft portion 17 of the depressing disc 16.

Figure 15:
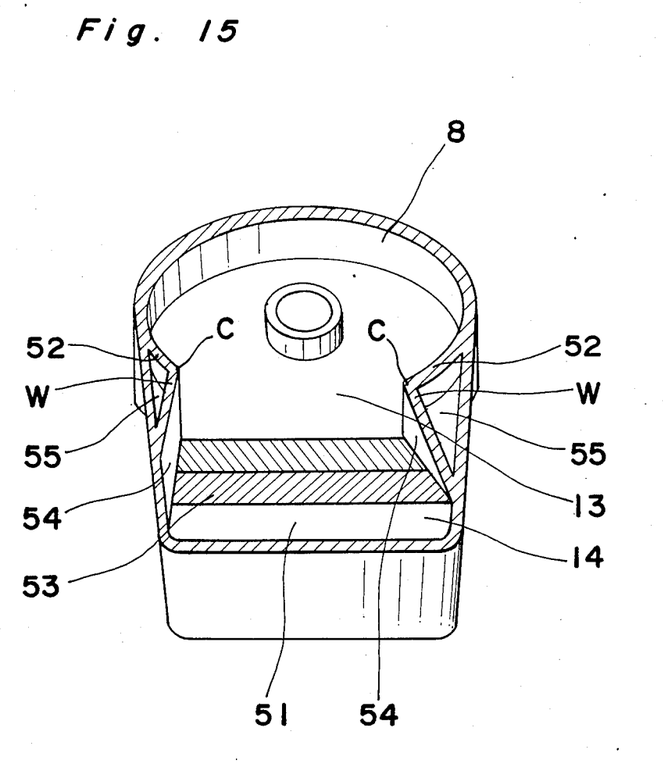
FIG. 15 is a perspective view of the discharge container partly in section in a horizontal direction.

Furthermore, as shown in FIG. 15, illustrating the configuration of the opening 13 shown in FIG. 2 in section, the opening 13 is provided, at its opposite sides, with a pair of ribs 52 which limit the discharging amount and which also prevent scattering of the cut pieces 11 out of a discharge port 51, while side walls 54 are provided for the opening 13 to connect the forward edges of the opening ribs 52 and the side walls of the discharge passage 14 as at C, and thus, the ribs 52 and the side walls 54 form generally V-shaped walls W, with the connecting portions C being located in the vicinity of the forward edge of a rear wall 53 of the discharge port 51.

By the provision of the opening side walls 54 as described above, the cut material tending to enter the rear portions 55 of the ribs 52 is led into the discharge port 51, while the cut pieces 11 to be discharged are brought into collision not with the forward end of the ribs 52, but with the side walls 54 at the large surface thereof, thus making it possible to prevent breaking of the cut material.

As is clear from the foregoing description, according to the electric food processor of the present invention, the material to be processed is not required to be preliminarily cut into small pieces, but may be readily cut if it is of a size which is smaller than the diameter of the container, and consequently, the material may be processed in an extremely efficient manner.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electric food processor for processing food, said processor comprising:
   a main body having an electric motor therein;
   a generally cylindrical retaining container detachably mountable on said main body for containing the food processed by the food processor when mounted on said main body, said generally cylindrical retaining container having an upper open end through which the food to be processed is placed therein, and an engagement means at said upper open end;
   a rotatable S-shaped cutter for cutting food within said retaining container, said S-shaped cutter operatively connectable to said motor to be rotated thereby within said retaining container when said retaining container is mounted on said main body;
   a discharge container detachably mountable on said main body so as to be exchangeable with said cylindrical retaining container, said discharge container having a discharge passage extending therethrough through which food processed within said discharge container is discharged outside of said discharge container, and said discharge container having an upper open end through which food to be processed is placed therein;
   a rotatable disc-shaped rotary base having a cutting blade thereon for cutting food within said discharge container, said rotary base operatively connectable to said motor so as to be exchangeable with said S-shaped cutter and so as to be rotated by said motor within said discharge container when said discharge container is mounted on said main body;
   a rotary disc operatively connectable to said motor to be rotated thereby when said discharge container is mounted on said main body, said rotary disc being disposed below said rotary base and adjacent said discharge path for discharging the food therethrough that is cut by said cutting blade of said rotary base; and
   a removable container lid for covering either of said upper open ends of said retaining container and said discharge container when either of said containers is mounted on said main body, said container lid having a shaft portion slidably mounted thereto and a pressing plate fixed to and extending around one end of said shaft portion, said shaft portion and said pressing plate slidable within said discharge container when said container lid covers said discharge container for pressing food therewithin toward said rotary base when said discharge container is mounted on said main body and said rotary base is operatively connected to said motor, and said pressing plate and said shaft portion engaging said engagement portion at said upper end of said retaining container when said container lid covers said retaining container such that said pressing plate and said shaft portion are prevented from sliding toward said S-shaped cutter when said retaining container is mounted on said main body and said S-shaped cutter is operatively connected to said motor.

2. An electric food processor as claimed in claim 1, wherein said container lid further comprises a push rod slidably mounted and extending within said shaft portion for pushing food towards either one of said S-shaped cutter and said rotary base when either one is operatively connected to said motor and when said container lid covers one of said retaining container and said discharge container respectively.

3. An electric food processor as claim in claim 1, and further comprising a switch at a side of said main body for actuating said motor when said switch is actuated, and
wherein said container lid further has an actuating portion abutting said switch when either one of said retaining container and said discharge container is mounted on said main body and is covered with said container lid, said actuating portion actuating said switch only while an external force is applied thereto.

4. An electric food processor as claimed in claim 1, wherein said rotary base has an outer upstanding wall extending around the periphery thereof and said cutting blade has an end abutting said outer upstanding wall and a cutting edge extending from said end toward the center of said rotary base, and an inner peripheral side of said wall facing the center of said rotary base extends along said end of said cutting blade, around the periphery of said rotary base to a point on said cutting edge spaced from said end of said cutting blade toward the center of said rotary base and then along said cutting edge to said end of said cutting blade, thereby preventing food cut by said cutter from becoming caught between said end of said cutting blade and said outer upstanding wall.

5. An electric food processor as claimed in claim 1, wherein said rotary disc disposed below said rotary base has a plurality of discharge ribs on the surface thereof that faces away from said rotary base, said discharge ribs extending on said surface in directions from the center of said rotary disc that are each at an angle relative to any radial direction emanating from the center of said rotary base.

6. An electric food processor as claimed in claim 1, wherein said container lid has a cylindrical bearing portion extending therethrough, said cylindrical bearing portion having a recess extending along the inner peripheral surface thereof in a direction parallel to the central longitudinal axis of said bearing portion from one end of the bearing portion to the other; and said shaft portion is slidably mounted within said bearing portion, said shaft portion having a projecting rib having a cross-sectional shape that is complimentary to that of said recess, said projecting rib extending from said one end of said shaft portion around which said pressing plate extends to a position spaced from the other end of said shaft portion by a distance that is greater than the length of said recess extending along the inner peripheral surface of said bearing portion, whereby when said one end of said shaft portion extends through said bearing portion and said projecting rib engages said recess, said shaft portion is prevented from rotation, and when said other end of said shaft portion extends through said bearing portion and said projecting rib is disengaged from said recess, said shaft is rotatable relative to said bearing portion.

7. An electric food processor as claimed in claim 1, wherein said discharge container has a pair of opposing V-shaped walls at said discharge path, and the vertices of said V-shaped walls face each other at the beginning of said discharge path along which the food is discharged from said discharge container when said discharge container is mounted to said main body.

8. An electric food processor for processing food, said processor comprising:

a main body having an electric motor therein;

a generally cylindrical retaining container detachably mountable on said main body for containing the food processed by the food processor when mounted on said main body, said generally cylindrical retaining container having an upper open end through which the food to be processed is placed therein, and an engagement means at said upper open end;

a rotatable S-shaped cutter for cutting food within said retaining container, said S-shaped cutter operatively connectable to said motor to be rotated thereby within said retaining container when said retaining container is mounted on said main body;

a discharge container detachably mountable on said main body so as to be exchangeable with said cylindrical retaining container, said discharge container having a discharge passage extending therethrough through which food processed within said discharge container is discharged outside of said discharge container, and said discharge container having an upper open end through which food to be processed is placed therein;

a rotatable disc-shaped rotary base having a cutting blade thereon for cutting food within said discharge container, said rotary base operatively connectable to said motor so as to be exchangeable with said S-shaped cutter and so as to be rotated by said motor within said discharge container when said discharge container is mounted on said main body;

a rotary disc operatively connectable to said motor to be rotated thereby when said discharge container is mounted on said main body, said rotary disc being disposed below said rotary base and adjacent said discharge path for discharging the food therethrough that is cut by said cutting blade of said rotary base;

a removable container lid for covering either of said upper open ends of said retaining container and said discharge container when either of said containers is mounted on said main body, said container lid having a shaft portion slidably mounted thereto and a pressing plate fixed to and extending around one end of said shaft portion, said shaft portion and said pressing plate slidable within said discharge container when said container lid covers said discharge container for pressing food therewithin toward said rotary base when said discharge container is mounted on said main body and said rotary base is operatively connected to said motor, and said pressing plate and said shaft portion engaging said engagement portion at said upper end of said retaining container when said container lid covers said retaining container such that said pressing plate and said shaft portion are prevented from sliding toward said S-shaped cutter when said retaining container is mounted on said main body and said S-shaped cutter is operatively connected to said motor; and a diode bridge and an SCR electrically connected to said motor in series, said SCR for regulating the voltage supplied to said motor from a commercial power source, a signal comparison circuit operatively electrically connected to said SCR, said signal comparison circuit comparing a counter electro-motive force produced by said motor during non-conduction of said SCR which is proportional to the rotational speed of said motor and hence said rotary base or said S-shaped cutter and a reference voltage corresponding to a predetermined rotational speed for issuing a signal to trigger said SCR to control the rotational speed of said motor, said signal comparison circuit issuing said signal after a time delay to trigger said SCR when the counter electro-motive force is higher than said reference voltage said signal comparison circuit issuing said signal in advance of said time delay when said counter electro-motive force is lower than said reference voltage, and an SCR trigger circuit operatively electrically connected between said signal comparison circuit and said SCR for amplifying said signal when issued by said SCR to trigger said SCR, whereby when a low load is exerted on said motor during cutting of the food by said rotary base and the cutting blade thereon and the food is discharged outside of said discharge container, said SCR regulates the voltage to said motor to reduce the rotational speed thereof such that the food is not damaged by said rotary base and cutting blade thereon due to an excessively high rotational speed of said motor, and when a high load is exerted on said motor during cutting of the food by said S-shaped cutter and retention of the cut food within said retaining container, said SCR regulates the voltage to said motor to increase the rotational speed thereof such that a sufficient rotational speed of the motor is maintained for enabling cutting of the food by said S-shaped cutter.

9. An electric food processor as claimed in claim 8, wherein said container lid further comprises a push rod slidably mounted and extending within said shaft portion for pushing food towards either one of said S-shaped cutter and said rotary base when either one of the latter are operatively connected to said motor and when said container lid covers one of said retaining container and said discharge container respectively.

* * * * *